(12) United States Patent
Corlett et al.

(10) Patent No.: US 7,982,890 B2
(45) Date of Patent: Jul. 19, 2011

(54) METHOD AND APPARATUS FOR SECURE PRINTING

(75) Inventors: Dylan Corlett, San Francisco, CA (US); Scott Christopher Crosby, Foster City, CA (US); Huy Phan, Union City, CA (US)

(73) Assignee: Electronics for Imaging, Inc., Foster City, CA (US)

(*) Notice: Subject to any disclaimer, the term of this patent is extended or adjusted under 35 U.S.C. 154(b) by 296 days.

(21) Appl. No.: 12/256,309

(22) Filed: Oct. 22, 2008

(65) Prior Publication Data

US 2009/0040557 A1 Feb. 12, 2009

Related U.S. Application Data

(63) Continuation of application No. 10/855,602, filed on May 26, 2004, now Pat. No. 7,463,374.

(51) Int. Cl.
*G06K 15/00* (2006.01)
*G06F 3/12* (2006.01)

(52) U.S. Cl. ............. 358/1.14; 358/1.15; 358/1.16

(58) Field of Classification Search ........ 358/1.14, 358/1.15, 1.13, 1.16, 1.17, 1.18, 1.1, 1.9, 358/404, 407, 437, 444, 468; 713/182, 183, 713/184, 186; 380/55, 232, 243, 258, 51; 347/2, 3, 5, 14; 399/1, 8, 9

See application file for complete search history.

(56) References Cited

U.S. PATENT DOCUMENTS

| | | | |
|---|---|---|---|
| 6,307,640 B1 | 10/2001 | Motegi | |
| 6,711,677 B1 | 3/2004 | Wiegley | |
| 7,298,505 B2 * | 11/2007 | Ueda | 358/1.14 |
| 2001/0016912 A1 | 8/2001 | Takahashi | |
| 2002/0065729 A1 | 5/2002 | Guillemin et al. | |
| 2002/0184342 A1 | 12/2002 | Kennedy et al. | |
| 2003/0187951 A1 | 10/2003 | Shen | |
| 2004/0010704 A1 | 1/2004 | Lewis | |

FOREIGN PATENT DOCUMENTS

EP 1120701 8/2001

* cited by examiner

*Primary Examiner* — Dov Popovici
(74) *Attorney, Agent, or Firm* — Michael A. Glenn; Glenn Patent Group (57) ABSTRACT

Systems and methods are provided for securely communicating a print job to a printer, the systems and methods pausing the print job in a print queue on a client computer, obtaining first authentication information regarding a user at the client computer, obtaining second authentication information regarding a user at a release station adjacent the printer, communicating the second authentication information from the release station to the client computer, and releasing the print job from the print queue if the second authentication information matches the first authentication information.

23 Claims, 6 Drawing Sheets

|  | User Identification | User Authentication |
|---|---|---|
| 102a → | john@xyz.com | GerOnlmo56 |
|  | billy001 | 1ONEraNgER7 |
| 102b → | 4456-3421-8758 | X721GM8Z |
|  |  |  |

*FIG. 5*

|  | User Identification | Client Identification |
|---|---|---|
| 112a → | john@xyz.com | 127.44.0.132 |
|  | billy001 | 127.44.0.132 |
| 112b → | 4456-3421-8758 | 33.6.127.14 |
|  |  |  |

*FIG. 6*

METHOD AND APPARATUS FOR SECURE PRINTING

CROSS REFERENCE TO RELATED APPLICATION

This application is a continuation of U.S. patent application Ser. No. 10/855,602, filed May 26, 2004 now U.S. Pat. No. 7,463,374, which is incorporated herein in its entirety by this reference hereto.

BACKGROUND

In a typical networked printing system, numerous computer workstations are coupled via a computer network to one or more print output devices, such as printers, plotters, copiers, facsimile machines and other similar print output devices (referred to herein as "networked printers"). To print a document on a networked printer, a user of one of the computer workstations typically selects a print command from within an application program, such as a word processor, spreadsheet, page layout application or other similar program, and selects one of the networked printers for printing the document. In most cases, such shared networked printing systems are extremely useful and efficient for printing a wide array of documents.

To facilitate ease of use, networked printers are often located in a central area that each user may access, such as a mail room, copy room, supply room or other common area. In some instances, however, a user may wish to print a sensitive document that is not suitable for such public access. For example, a user may wish to print a document that includes personnel information, health records, financial statements or other sensitive information. Unfortunately, previously known shared networked printing systems typically do not permit secure printing. As a result, a user of such a system who prints a sensitive document typically must send the print job to a networked printer and then rush to the device to retrieve the printed document. If the networked printer is not located near the user, the user is distracted on the way to the networked printer, or someone else is already at the networked printer when the print job is sent, the sensitive document may be viewed by unauthorized people.

Figure 1:
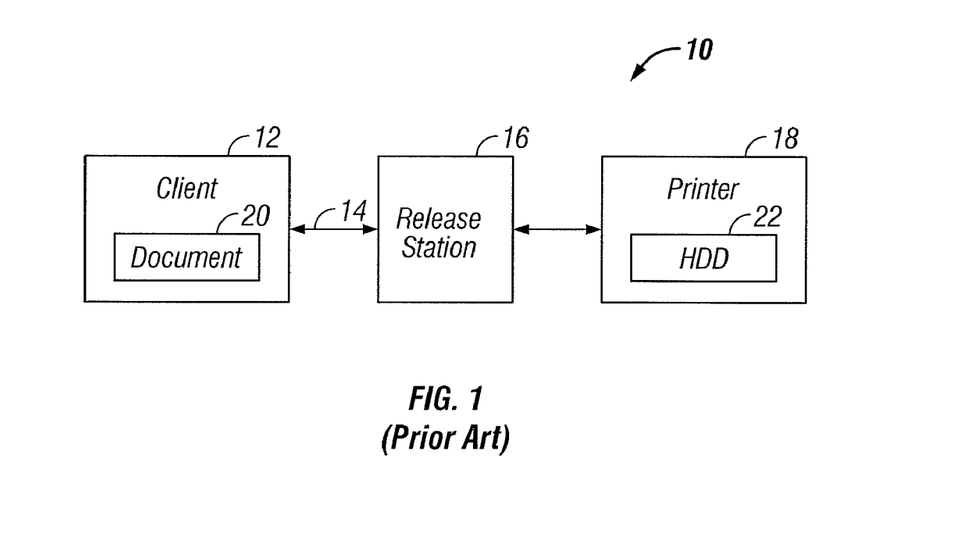
FIG. 1 is a block diagram of a previously known printing system.

One previously known printing system that seeks to address this problem is illustrated in FIG. 1. System 10 includes client device 12, which is coupled via network 14 to release station 16 and printer 18. Client device 12 may be a computer workstation, such as a desktop computer, that includes document 20. Network 14 may be a computer network, such as a local area network. Release station 16 may be included as part of printer 18, or may be a separate device that is located near printer 18. To print document 20, client computer 12 may include an application program (not shown) that converts document 20 to an encrypted print stream, and then sends the encrypted print stream along with authentication information to release station 16 via network 14. For example, the authentication information may be a user-supplied password.

On receipt, release station 16 stores the encrypted print stream and authentication information on hard disk drive ("HDD") 22 included in printer 18. To obtain a printout of document 20, the user then goes to release station 16 and enters the authentication information. For example, the user may enter the password on a keypad (not shown) coupled to release station 16. If the authentication information provided by the user matches the authentication information stored in HDD 22, release station 16 then decrypts the encrypted print stream and sends the print job to printer 18.

Unfortunately, printing system 10 has numerous disadvantages that undermine the security and applicability of such systems. First, because client computer 12 sends the encrypted print stream to release station 16 before authentication occurs, the encrypted print stream may be intercepted, and the security of the system may be compromised. For example, a computer hacker may replace printer 18 with a "rogue" printer (i.e., a printer other than printer 18), which may then be used to obtain unauthorized access to document 20. Even though the user may subsequently discover that printer 18 was replaced by the rogue printer (e.g., when the user attempts to authenticate the print job at the printer), the print job will have already been communicated to the rogue printer, and it therefore may be impossible to prevent the unauthorized access.

Second, because a print job remains on HDD 22 until it is printed, the user may be unable to delete the print job from the hard drive without printing the print job. Thus, if a user decides not to print the job, the encrypted print stream may nevertheless remain on HDD 22. As a result, a computer hacker may be able to retrieve the encrypted print job from the hard drive, and obtain unauthorized access to document 20. Third, because system 10 requires that printer 18 include a hard disk drive, the system may not work with a large number of printers that do not include a hard drive. As a result, system 10 has limited applicability.

Figure 2:
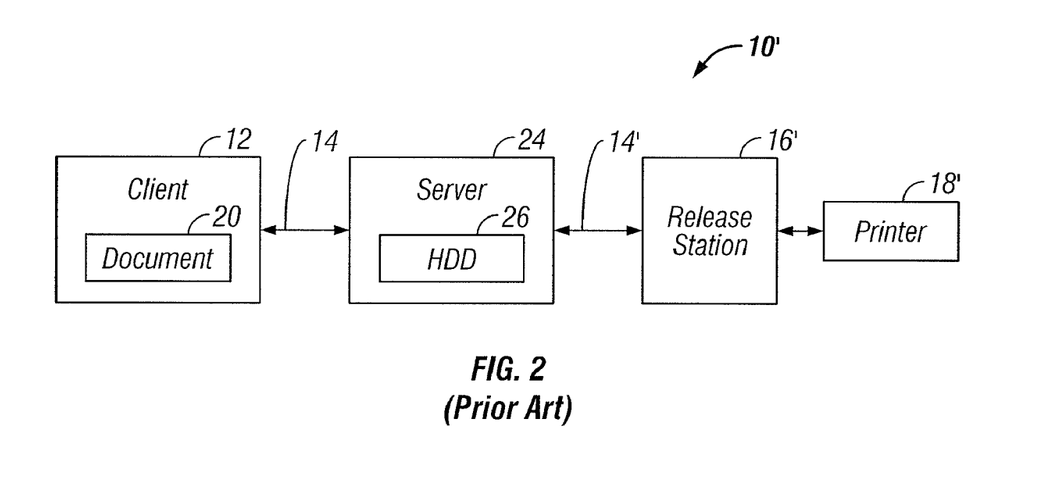
FIG. 2 is a block diagram of another previously known printing system.

Referring now to FIG. 2, another previously known secure printing system is described. System 10' is similar to system 10, but also includes server 24 that is coupled to client device 12 via network 14 and to release station 16' via network 14'. Networks 14 and 14' may be the same network (e.g., a local area network), or may be distinct networks (e.g., network 14 may be a local area network and network 14' may be the Internet). Server 24 includes HDD 26. Release station 16' may be included as part of printer 18, or may be a separate device that is located near printer 18'. Unlike printer 18 in system 10, printer 18' need not have a hard disk drive. To print document 20, client computer 12 may include an application program (not shown) that converts document 20 to a print stream, and then sends the print stream along with authentication information to server 24 via network 14. For example, the authentication information may be a user name and password.

On receipt, server 24 stores the print stream and authentication information on HDD 26. To obtain a printout of document 20, the user then goes to release station 16' and enters the authentication information. For example, the user may enter the password on a keypad (not shown) coupled to release station 16', which may communicate the authentication information to server 24. If the authentication information provided by the user matches the authentication information stored in HDD 26, server 24 will then send the print stream to release station 16', which then forwards the print job to printer 18.

Unfortunately, printing system 10' also has numerous disadvantages that undermine the security and applicability of the system. First, during communication of the print stream from client 12 to server 24, the print stream may be intercepted, and the security of the system may be compromised. Although it may be possible to encrypt the print stream prior to transmission to server 24, the encrypted print job nevertheless will reside on HDD 26 prior to release. As a result, a computer hacker may be able to retrieve the print job from the hard drive, and obtain unauthorized access to document 20.

Second, system 10' requires the addition and maintenance of server 24, which adds to system cost and complexity.

In view of the forgoing, it would be desirable to provide methods and apparatus for secure networked printing.

It further would be desirable to provide methods and apparatus that wait to send a print job from a client device to a networked printer until after authentication information is provided at or near the printer.

It additionally would be desirable to provide methods and apparatus that allow a secure print job to be managed from a client device before the print job is sent to a networked printer.

It moreover would be desirable to provide methods and apparatus for secure document printing that do not require a printer with a hard disk drive.

It also would be desirable to provide methods and apparatus for secure document printing that do not require that the print job be stored on a hard disk drive away from the client device.

SUMMARY

In view of the foregoing, it is an object of this invention to provide methods and apparatus for secure networked printing.

It further is an object of this invention to provide methods and apparatus that wait to send a print job from a client device to a networked printer until after authentication information is provided at or near the printer.

It additionally is an object of this invention to provide methods and apparatus that allow a secure print job to be managed from a client device before the print job is sent to a networked printer.

It moreover is an object of this invention to provide methods and apparatus for secure document printing that do not require a printer with a hard disk drive.

It also is an object of this invention to provide methods and apparatus for secure document printing that do not require that the print job be stored on a hard disk drive away from the client device.

These and other objects of this invention are accomplished by providing systems and methods that securely communicate a print job to a printer, the systems and methods pausing the print job in a print queue on a client computer, obtaining first authentication information regarding a user at the client computer, obtaining second authentication information regarding a user at a release station adjacent the printer, communicating the second authentication information from the release station to the client computer, and releasing the print job from the print queue if the second authentication information matches the first authentication information.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

Figure 3:
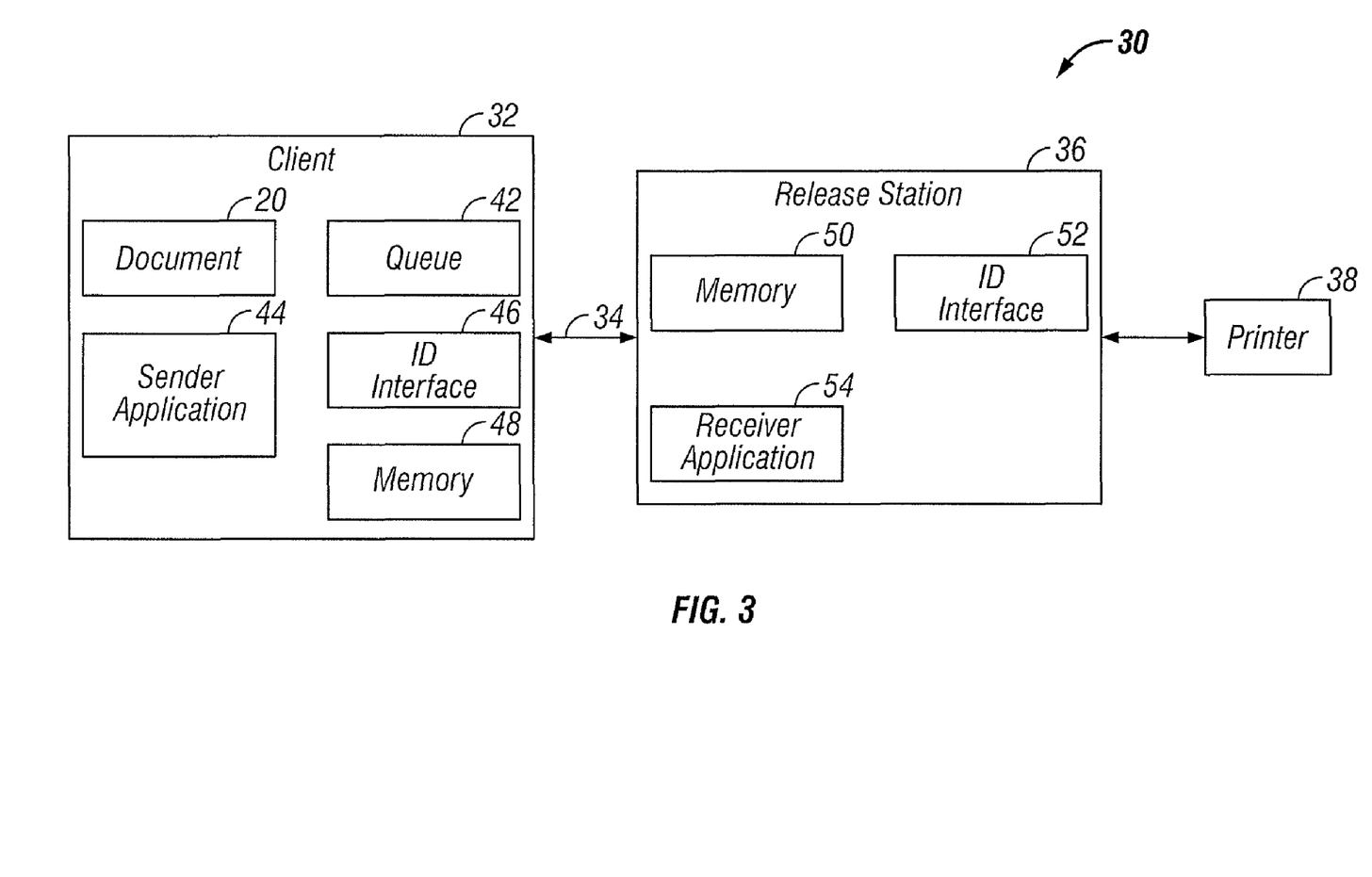
FIG. 3 is a block diagram of an exemplary printing system in accordance with this invention.

Referring to FIG. 3, an exemplary printing system in accordance with this invention is described. Printing system 30 includes client computer 32 coupled via network 34 to release station 36. Client computer 32 may be a personal computer, desktop computer, laptop computer, handheld computer, computer workstation, personal digital assistant, cellular telephone, or other similar computer device. Client computer 32 includes document 20, print queue 42, sender application 44, ID interface 46 and memory 48. Network 34 may be a local area network, wide area network, public network, wireless network, the Internet, or other similar network or combination thereof. Network 34 may be a single network, or may be multiple interconnected networks.

Release station 36 is coupled to printer 38, and includes memory 50, ID interface 52 and receiver application 54. Release station 36 may be implemented in a standalone device coupled to printer 38, or may be included as part of printer 38 or other device coupled to printer 38 (e.g., a printer controller, such as a Fiery®, Splash™, or EDOX® controller manufactured by Electronics for Imaging, Inc., Foster City, Calif., U.S.A., or other similar printer controller).

Printer 38 may be any conventional printer, copier, plotter, facsimile machine or other similar print output device that may receive a print stream describing a print job, and provide a printed output of the print job. Printer 38 may be an inkjet printer, a laser printer, a black-and-white printer, color printer, pen plotter, offset press, thermal diffusion printer, dye sublimation printer or any other similar print output device. The print stream may include a bitmap representation of the print job, or may include a description of the print job in a page description language ("PDL"), such as a PCL, PostScript, PDF or other similar PDL.

Referring now to FIGS. 3 and 4A-C, an exemplary secure printing method 60 in accordance with this invention is described. In particular, beginning at step 62, a user submits a document to print queue 42 for secure printing. For example, a user of client computer 32 may select a print command from within an application program (not shown), such as a word processor, spreadsheet, page layout application or other similar program, and select printer 38 for securely printing document 20. The application may call a printer driver (not shown), which converts document 20 to a PDL and provides the print job to print queue 42. The application or the printer driver also may alert sender application 44 that the print job is a secure print job.

Referring again to FIG. 4A, at step 64, sender application 44 pauses the print job in print queue 42. For example, if client computer 32 is a computer device running a Microsoft® Windows® operating system, sender application 44 may implement a script that pauses the print job in print queue 42. Persons of ordinary skill in the art will understand that other similar technique may be used to pause the print job in print queue 42.

Figure 4A:
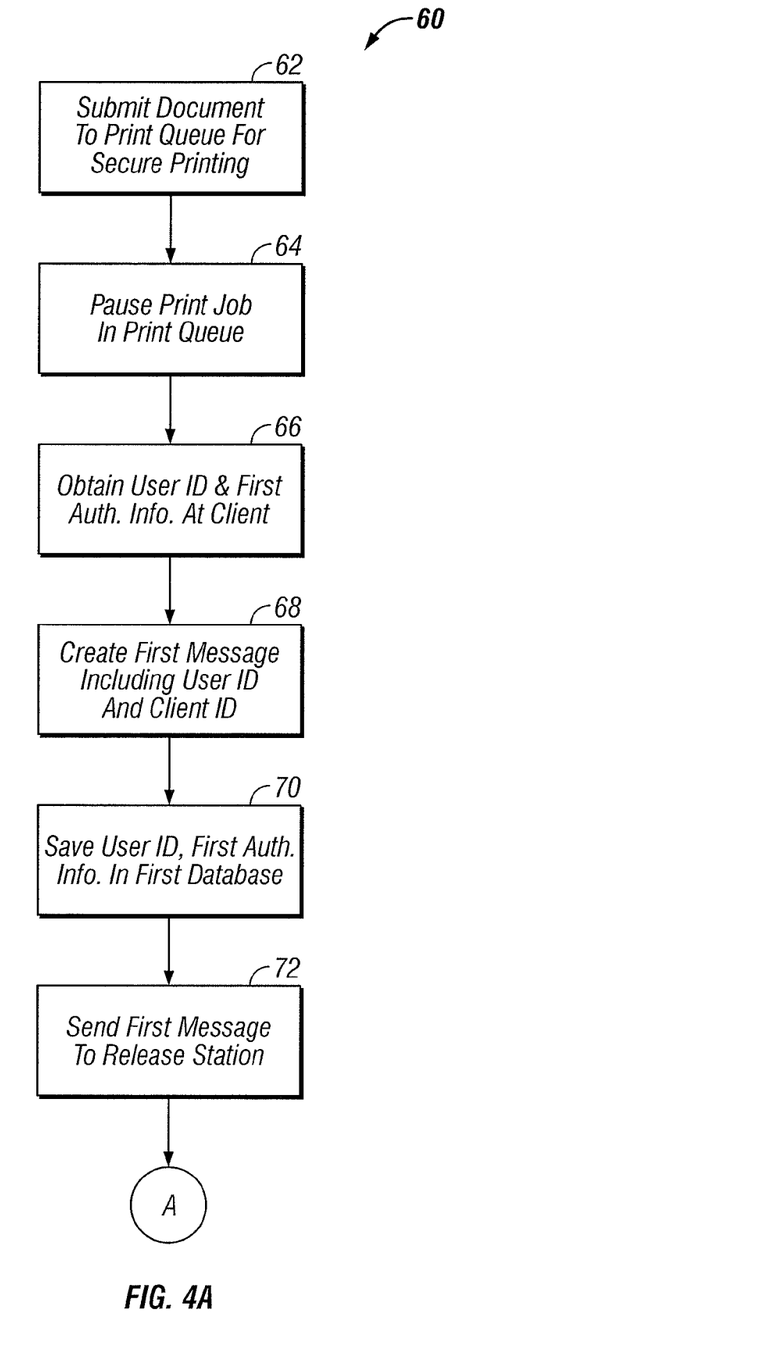
FIGS. 4A-C are flow diagrams of an exemplary method in accordance with this invention.

Next, at step 66, sender application 44 obtains user identification information and first authentication information. Exemplary user identification information may include a user name, account number, email address, or other similar information that may be used to uniquely identify a user. Exemplary first authentication information may include a password, personal identification number ("PIN"), fingerprint, retinal profile, voice print, DNA profile, or any other similar information that may be used to uniquely authenticate a user. Sender application 44 may obtain user identification information and first authentication information by prompting a user to provide the information via ID interface 46, which may include a touch screen, keyboard, monitor, mouse, display, card reader, voice recorder, biometric input device (e.g., electronic fingerprint reader, retinal scanner, DNA profiler or other similar biometric device), or other similar interface for providing user identification information and first authentication information.

In particular, ID interface 46 may include a display and keyboard, and a user may provide a user name and password via the keyboard. Alternatively, ID interface 46 may include a touch screen display, and a user may provide an account number and password via the display. ID interface 46 alternatively may include a magnetic card reader, and a user may swipe a card that includes an email address and a password magnetically encoded in the card. Persons of ordinary skill in the art will understand that ID interface 46 may include any similar interface for providing user identification information and first authentication information.

Persons of ordinary skill in the art also will understand that sender application 44 alternatively may obtain user identification information and first authentication information by retrieving the information from a network registry, database, domain controller, smart card or other similar source of user identification information and first authentication information. Such alternative sources of user identification information and first authentication information may be included on client computer 32, or may be included on some other network device (not shown).

Referring again to FIG. 4A, at step 68, sender application 44 creates a first message including the user identification information obtained at step 66, plus client computer identification information. The client computer identification information may include a network Internet Protocol ("IP") address, email address, computer name or other similar information that uniquely identifies client computer 32. For example, if the user identification information is "john@xyz.com," and the client computer identification information is IP address "127.44.0.132," an exemplary first message may be:

john@xyz.com, 127.44.0.132

Persons of ordinary skill in the art will understand that alternative formats may be used for the first message.

Figure 5:
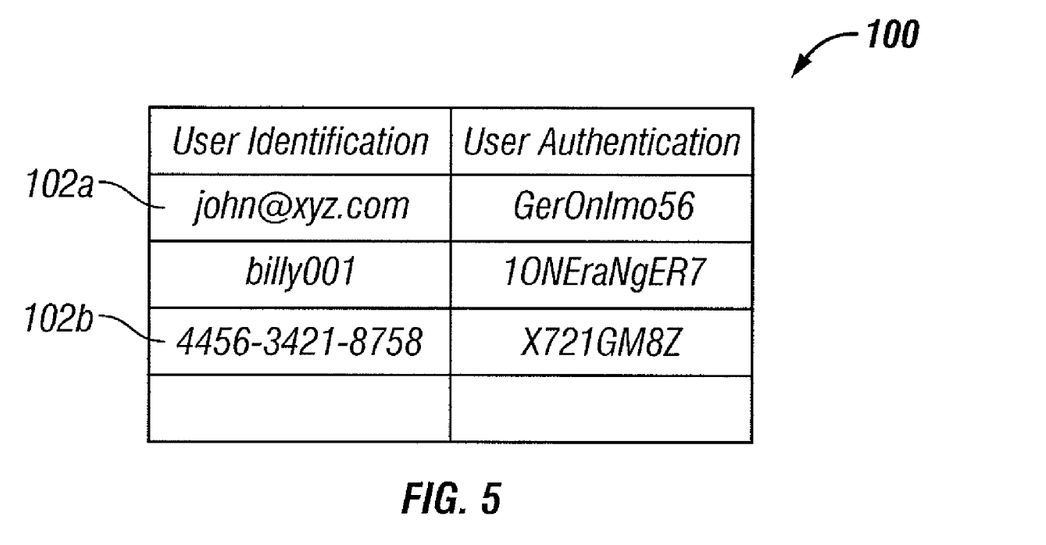
FIG. 5 is a diagram of an exemplary database for use with methods and apparatus in accordance with this invention.

Next, at step 70 sender application 44 saves in memory 48 the user identification information and first authentication information obtained at step 66 (unless the information already is stored in a network registry, database, domain controller, smart card, or other similar source of user identification information and first authentication information). Memory 48 may be any conventional memory, such as a hard disk, floppy disk, optical disk, random access memory ("RAM") or other similar memory. Memory 48 may include a first database that includes multiple records, wherein each record associates the user identification information and first authentication information of a corresponding first message. An example of such a first database is illustrated in FIG. 5, in which first database 100 includes multiple records 102, wherein each record includes user identification information (e.g., john@xyz.com) and first authentication information (e.g., GerOnImo56) of a corresponding first message.

Figure 6:
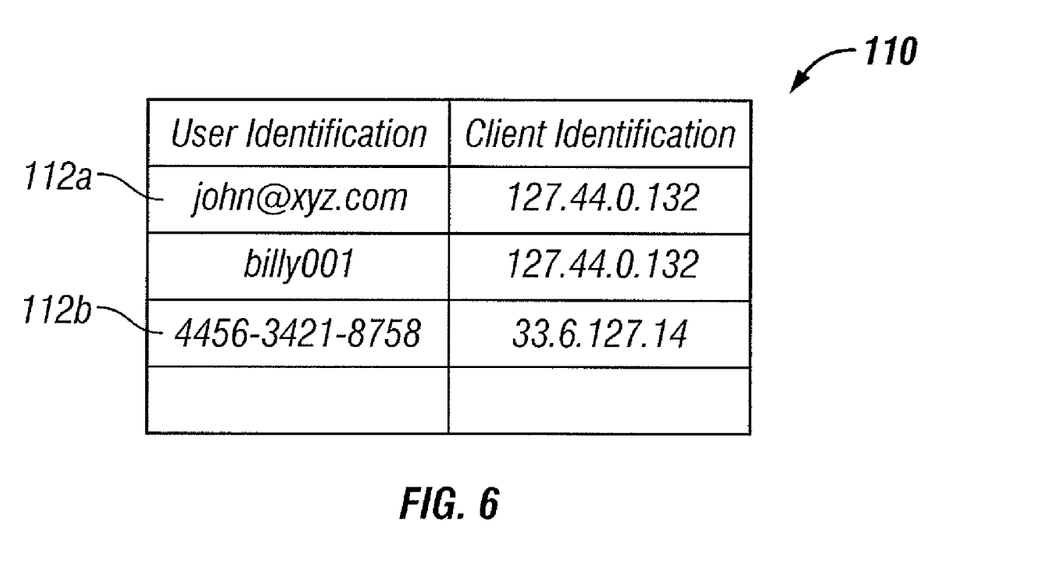
FIG. 6 is a diagram of another exemplary database for use with methods and apparatus in accordance with this invention.

Referring again to FIG. 4, at step 72, sender application 44 sends the first message to release station 36, which stores the received first message in memory 50, which may be any conventional memory, such as a hard disk, floppy disk, optical disk, RAM or other similar memory. For example, memory 50 may include a second database that includes multiple records, wherein each record specifies the user identification information and associated client identification information of each first message received from sender application 44. An example of such a second database is illustrated in FIG. 6, in which second database 110 includes multiple records 112, wherein each record includes the user identification information (e.g., john@xyz.com) and computer identification information (e.g., 127.44.0.132) of a corresponding received first message.

Referring again to FIG. 4B, at step 74, release station 36 prompts the user to provide user identification information and second authentication information. For example, referring again to FIG. 3, release station 36 may include ID interface 52, which may be used to provide user identification and second authentication information. ID interface 52 may include a touch screen, keyboard, monitor, mouse, display, card reader, voice recorder, biometric input device, or other similar interface for providing information identifying and authenticating the identity of the user. For example, ID interface 52 may include a display and keyboard, and a user may provide a username and password via the keyboard. Alternatively, ID interface 52 may include a touch screen display, and a user may provide an account number and password via the display. ID interface 52 alternatively may include a magnetic card reader, and a user may swipe a card that includes an email address and a password magnetically encoded in the card. Persons of ordinary skill in the art will understand that ID interface 52 may include any similar interface for providing user identification and second authentication information.

Referring again to FIG. 4B, at step 76, release station 36 determines if there are any secure print jobs for the user. In particular, receiver application 54 may determine if the user identification information provided to ID interface 52 matches user identification information of any first messages stored in memory 50. For example, receiver application 54 may search for records in second database 70 that have matching user identification information (e.g., "john@xyz.com"). If there are no matches, at step 78 receiver application 54 may inform the user that no secure print jobs are waiting to be printed.

Figure 4B:
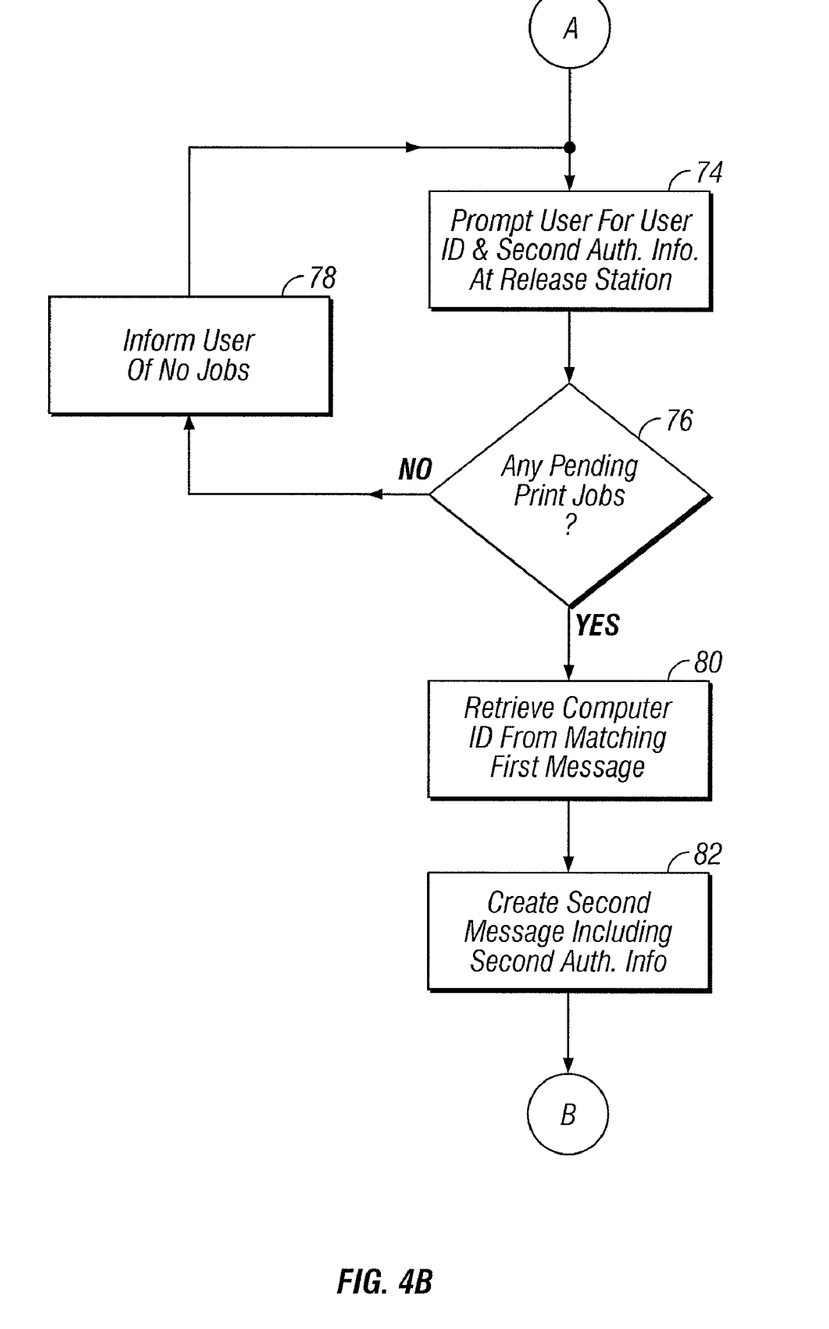

If, however, there is a match, at step 80 receiver application 54 retrieves the client computer identification information (e.g., 127.44.0.132) from the record of the matching first message. Next, at step 82, receiver application 54 creates a second message including the user identification information and second authentication information received from the user at step 74. For example, if the user identification information is "john@xyz.com" and the received second authentication information is "GerOnImo56," an exemplary second message may be:

john@xyz.com, GerOnImo56

Persons of ordinary skill in the art will understand that alternative formats may be used for the second message.

Referring again to FIG. 4C, at step 84, receiver application 54 sends the second message to client computer 32 using the computer identification information retrieved at step 80. For example, if the matching first message includes the IP address of client computer 32 (e.g., 127.44.0.132), receiver application 52 sends the user identification information and the second authentication information to client computer 32 using the matching IP address.

Figure 4C:
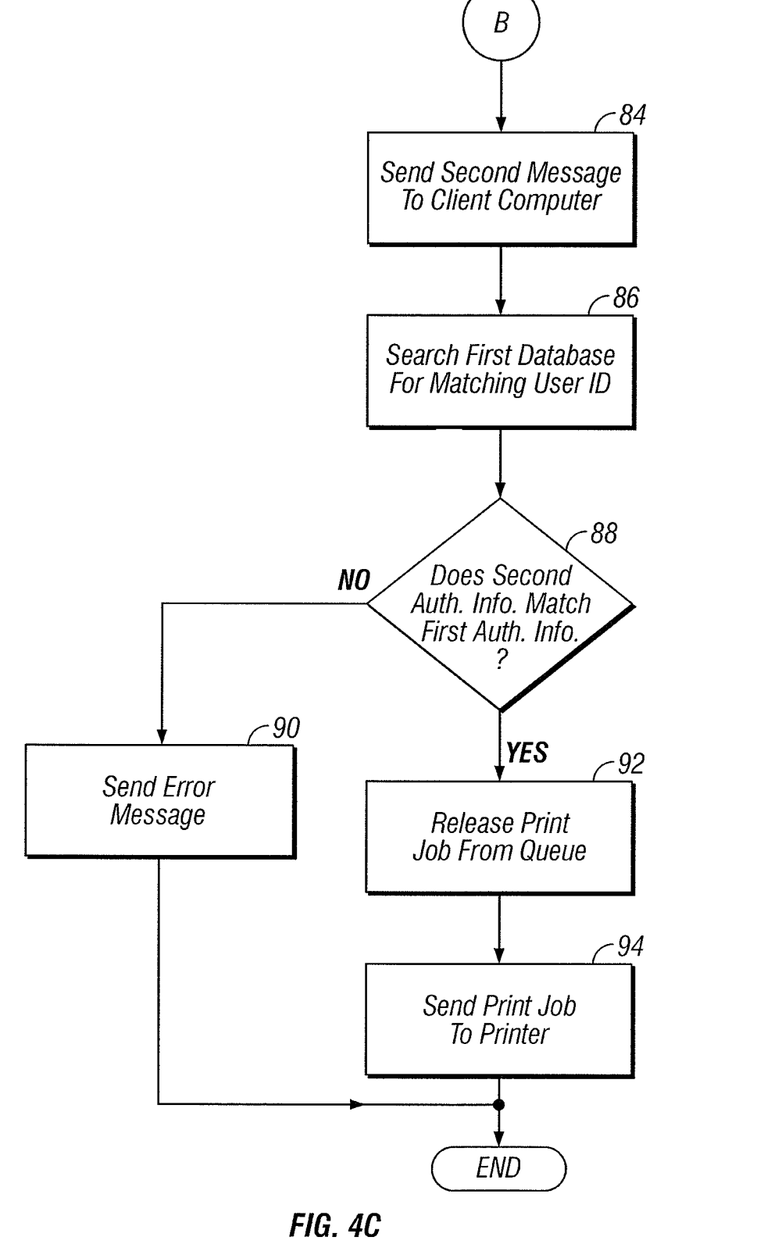

Next, at step 86, sender application 44 searches first database 60 for a record that includes user identification information that matches the user identification information included in the second message. At step 88, sender application 44 retrieves the first authentication information included in the matching record, and then determines if the second authentication information received in the second message at step 84 matches the first authentication information. If there is no match, at step 90 sender application 44 may send an error message to receiver application 52, which may inform the user that they are not authorized to print the secure print job. In addition, sender application 44 may notify the user (e.g., via an email message or other similar communication) that an unauthorized attempt was made to retrieve the secure print job. If, however, the second authentication information matches the first authentication information, at step 92 sender application 44 releases the print job from the print queue and sends the print job to release station 36 via network 34. For added security, sender application 44 may encrypt the print job prior to sending the job to release station 36. At step 94, receiver application 54 may decrypt the print job (if necessary), and then send the decrypted print job to printer 38 for printing.

Persons of ordinary skill in the art will understand that sender application 44 may be implemented using as a standalone application program running on client computer 32. Alternatively, sender application 44 may be implemented as a customized version of one or more application programs that are commonly used to communicate print jobs to a conventional print output device. For example, in a Microsoft Windows operating system environment, a port monitor controls communications between the client device and the designated printer. Alternatively, in UNIX and Apple Macintosh operating system environments, backend programs are used to send print data to the designated printer. The functions of sender application 44 described above may be implemented by creating a custom port monitor or backend program that may be used to encrypt print jobs and send secure print jobs to printer 38 in accordance with this invention.

The foregoing merely illustrates the principles of this invention, and various modifications can be made by persons of ordinary skill in the art without departing from the scope and spirit of this invention.

The invention claimed is:

1. A release station coupled to a client computer, comprising:
   the client computer comprising a document to be printed, wherein said document is converted into a print job by an application resident on said client computer, a sender application and a print queue for receiving said print job, the sender application adapted to receive first authentication information regarding a user, and pause the print job in the print queue, said release station also coupled to a print output device, the release station comprising:
   a receiver application adapted to receive second authentication information regarding the user and communicate the second authentication information to the sender application, wherein the sender application releases the print job from the print queue if the second authentication information from the receiver application matches said first authentication information;
   wherein said first authentication information is previously provided to the sender application from a source other than said receiver application.

2. The release station of claim 1, wherein the print job comprises an encrypted print job.

3. The release station of claim 1, wherein the print job comprises a page description language.

4. The release station of claim 1, wherein the sender application comprises a port monitor.

5. The release station of claim 1, wherein the sender application comprises a backend program.

6. The release station of claim 1, wherein the first authentication information previously provided to the sender application from a source other than said receiver application comprises a password.

7. The release station of claim 1, wherein the first authentication information previously provided to the sender application from a source other than said receiver application comprises a personal identification number.

8. The release station of claim 1, wherein the first authentication information previously provided to the sender application from a source other than said receiver application comprises a fingerprint.

9. The release station of claim 1, wherein the first authentication information previously provided to the sender application from a source other than said receiver application comprises a retinal scan.

10. The release station of claim 1, wherein the first authentication information previously provided to the sender application from a source other than said receiver application comprises a DNA sample.

11. The release station of claim 1, wherein the first authentication information previously provided to the sender application from a source other than said receiver application comprises a voice print.

12. The release station of claim 1, wherein the release station comprises a standalone device.

13. The release station of claim 1, wherein the print output device comprises the release station.

14. The release station of claim 1, wherein the second release station further comprises:
   a user interface;
   wherein the receiver application receives the second authentication information from the user interface.

15. The release station of claim 1, wherein the second authentication information received at the receiver application comprises a password.

16. The release station of claim 1, wherein the second authentication information received at the receiver application comprises a personal identification number.

17. The release station of claim 1, wherein the second authentication information received at the receiver application comprises a fingerprint.

18. The release station of claim 1, wherein the second authentication information received at the receiver application comprises a retinal scan.

19. The release station of claim 1, wherein the second authentication information received at the receiver application comprises a DNA sample.

20. The release station of claim 1, wherein the second authentication information received at the receiver application comprises a voice print.

21. The release station of claim 1, wherein the print output device comprises a printer.

22. The release station of claim 1, wherein the print output device comprises a copier.

23. A method for securely communicating a print job to a print output device, the method comprising the steps of:
   obtaining second authentication information regarding a user at a release station proximate to the print output device;
   communicating the second authentication information from the release station to a client computer, the client computer comprising a document to be printed, wherein said document is converted into said print job by an application resident on said client computer, a sender application and a print queue for receiving said print job, the sender application adapted to receive first authentication information regarding a user, and pause the print job in the print queue;

releasing the print job from the print queue on the client computer if the second authentication information from the release station matches the first authentication information previously provided to the client computer;

wherein said first authentication information is from a source other than said release station.

* * * * *